United States Patent [19]

Olsen

[11] 3,766,306
[45] Oct. 16, 1973

[54] ELECTRIC HIGH-VOLTAGE COMPRESSED-GAS-INSULATED POWER TRANSMISSION LINE

[75] Inventor: Willi Olsen, Berlin, Germany

[73] Assignee: Siemens Aktiengesellschaft, Munich, Germany

[22] Filed: Jan. 9, 1973

[21] Appl. No.: 322,211

[52] U.S. Cl. ............... 174/16 B, 174/28, 174/99 B, 174/107, 174/115
[51] Int. Cl. ............................................. H01b 9/06
[58] Field of Search ............. 174/16 B, 99 B, 25 G, 174/27, 28, 29, 36, 102 R, 107, 113 R, 115, 73 R, 15 C

[56] References Cited
UNITED STATES PATENTS

| | | | |
|---|---|---|---|
| 3,692,921 | 9/1972 | Yonkers | 174/73 R |
| 3,610,947 | 10/1971 | Stephanides et al. | 174/28 |
| 3,413,406 | 11/1968 | Plummer | 174/36 |
| 3,023,267 | 2/1962 | Rubinstein et al. | 174/115 |
| 3,032,604 | 5/1962 | Timmons | 174/36 X |

Primary Examiner—Bernard A. Gilheany
Assistant Examiner—A. T. Grimley
Attorney—Hugh A. Chapin et al.

[57] ABSTRACT

An electric high-voltage compressed-gas-insulated power transmission line has an electric power conductor within and in spaced relation to a tubular enclosure filled with compressed gas insulation and able to withstand normal stressing electrically and/or thermally but not able to withstand such stressing when it becomes excessive. At least one electrically grounded electric conductor is fixed to the inside of this enclosure and extends longitudinally thereof and is itself capable of withstanding such excessive stressing. This grounded conductor projects transversely from the enclosure's inside far enough to cause the electrostatic field normally surrounding the power conductor to concentrate on the grounded conductor so the latter receives such stressing instead of the enclosure, thus protecting the enclosure.

6 Claims, 2 Drawing Figures

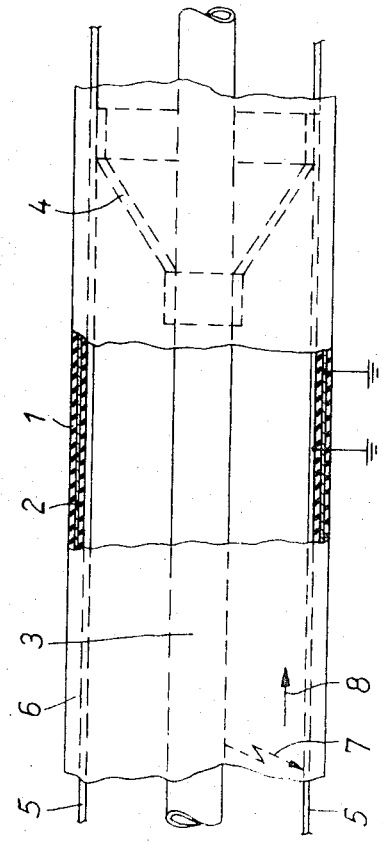
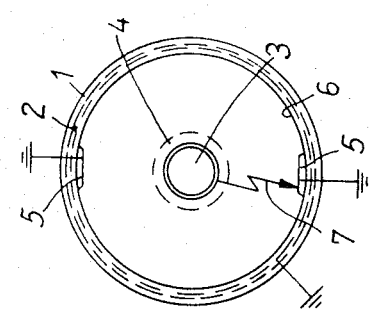

ELECTRIC HIGH-VOLTAGE COMPRESSED-GAS-INSULATED POWER TRANSMISSION LINE

BACKGROUND OF THE INVENTION

High-voltage compressed-gas-insulated electric power transmission lines have an electric power conductor positioned within and in spaced relation to a tubular metal enclosure which is electrically grounded and filled with compressed gas insulation. When the enclosure is formed by a metal wall thick enough so that if, due to an electrical disturbance, arcing occurs between the power conductor and the inside of the enclosure, the latter remains solid, the enclosure provides the protection it should both electrically and against loss of the compressed gas insulation. Such a line, for example, may carry 3,000 amperes at 220 kilovolts through densely populated areas, so such protection is important.

To reduce the cost of such lines, German Published Pat. application No. 2,021,066 discloses the concept of substituting for the heavy solid-walled metal enclosure, one which is made of plastic or other non-metallic material and, therefore, electrically insulating material, the inside of this enclosure being provided with a relatively thin electrically conductive metallic lining providing electrostatic shielding which is electrically grounded. The power conductor is spaced on the inside by electrically insulating spacers as is, of course, the power conductor in all cases.

This less expensive line may be installed as usual and is safe when handling normal stresses, electrical and/or thermal. However, it is unable to resist such stresses safely when they become excessive due to arcing between the power conductor and the metallic lining providing the required electrostatic shielding. The non-metallic part provides most of the mechanical strength and it loses its strength when overheated so that it may rupture, creating both electrical and gas hazards. These hazards cannot be safely avoided by making the electrical insulating spacers permeable and causing the arc to travel longitudinally along the line to a place where it may be permitted to stand safely until the condition causing the arcing can be corrected.

SUMMARY OF THE INVENTION

One object of the present invention is to provide a correction for the problem just described above without increasing the cost of a line using the non-metallic enclosure shielded with the relatively thin metallic lining, to a point losing the economic advantage is has over a line provided with a fully metallic enclosure of adequate wall thickness to be safely resistant by itself to arcing conditions.

According to the present invention, this object is attained by fixing at least one grounded conductor to the inside of the metallic shielding of the non-metallic enclosure. It is to be understood that usually in these power transmission lines the enclosure is tubular and the conductor is linear.

This grounded conductor extends longitudinally with respect to the line and is thick enough to project from the inside of the metallic shielding to a degree causing the electrostatic field surrounding the conductor to concentrate somewhat on the grounded conductor. Therefore, any arc that forms is struck between this conductor and the power conductor. The grounded conductor is made so it is itself capable of resisting the arcing stresses involved, so the hazardous condition previously indicated is reduced or eliminated. Greater assurance is obtained by the use of pervious electrically insulating spacers for positioning the power conductor and through which the arc may travel, permitting the use of known expedients for causing an arc that occurs to travel longitudinally along the power transmission conductor to a place where it may be permitted to stand safely until correction of the condition causing the arcing can be effected.

For electrical reasons the enclosure is not only tubular but also is made with a circular cross section and the linear conductor is of uniform diameter throughouts its length and positioned by the electrically insulating spacers concentrically within the enclosure. More than one of the grounded conductors may be used, these being fixed to the inside of the non-metallic enclosure's electrically conductive shielding and arranged symmetrically with respect to the power conductor and with respect to each other.

BRIEF DESCRIPTION OF THE DRAWINGS

A preferred embodiment of the invention is illustrated somewhat schematically by the accompanying drawings in which:

FIG. 1 is a side view partly in elevation and partly in longitudinal section; and FIG. 2 is an end view looking at one end of the line as it would appear prior to installation with other associated equipment.

DESCRIPTION OF THE PREFERRED EMBODIMENT

The above drawings show the non-metallic electrically insulating tubular enclosure 1 lined with the metallic electrically conductive shielding 2 with the linear electric power conductor 3 positioned concentrically within the enclosure 1-2 by electrically insulating spacers 4 which are pervious to a traveling electric arc such as might be struck between the power conductor 3 and the shielding 2. Even though means are provided to assure that such an arc travels lengthwise along the line to a safe standing point, the traveling arc stresses the enclosure 1-2 unsafely.

According to the invention, two grounded conductors 5 extend longitudinally or lengthwise of the line and are fixed to the enclosure's inside and to its metallic shielding or lining 2. The connection should be rigid and strong and the grounded conductors should be of adequate thickness to perform their previously described function. The conductors 5 may be in the form of flat bars welded to the metallic lining or shielding 2 and as shown particularly well by FIG. 2, they should be thick enough to project radially inwardly or transversely far enough to assure that the electrostatic field surrounding the conductor 3 when the latter is in service tends to concentrate on these grounded conductors. However, they should not project so far as to result in arcing under the normal service conditions the line is expected to handle. In effect, the grounded conductors or bars 5 should increase the thickness of the electrostatic shielding 2 to approximately that of the solid metal walled type.

With the use of this invention, if between the power conductor 3 and the inside surface 6 of the enclosure, an arc 7 is struck, it is struck on one or the other of the grounded conductors 5 along which it may travel safely through the arc-permeable spacers 4 to a safe standing position.

What is claimed is:

1. An electric high-voltage compressed-gas-insulated power transmission line having an electric power conductor positioned within and in spaced relation to a tubular enclosure having an electrically-grounded electrically-conductive interior and filled with compressed gas insulation and unable to withstand excessive stressing electrically and/or thermally; wherein the improvement comprises at least one electrically-grounded electric conductor fixed to the inside of said enclosure and extending longitudinally thereof and capable of withstanding said stressing to a greater degree than is said enclosure.

2. The line of claim 1 in which said grounded conductor projects transversely from said inside far enough to cause the electrostatic field normally surrounding said power conductor to tend to concentrate on the grounded conductor.

3. The line of claim 2 with said power conductor positioned within said enclosure by electrically insulating spacers which are permeable to an electric arc traveling between said conductors longitudinally thereof.

4. The line of claim 1 in which said power conductor is symmetrically positioned with respect to the inside of said enclosure, and a plurality of said electrically-grounded conductors are symmetrically positioned with respect to each other and said power conductor.

5. The line of claim 4 in which said grounded conductors project from the inside of said enclosure far enough to cause the electrostatic field normally surrounding said power conductor to concentrate on the grounded conductors.

6. The line of claim 3 in which said enclosure comprises an electrically non-conductive non-metallic tube lined with an electrically-conductive metal liner and the enclosure is capable of withstanding normal stressing electrically and/or thermally.

* * * * *

UNITED STATES PATENT OFFICE
CERTIFICATE OF CORRECTION

Patent No. 3,766,306      Dated October 16, 1974

Inventor(s) Willi Olsen

It is certified that error appears in the above-identified patent and that said Letters Patent are hereby corrected as shown below:

Amend the heading of the patent to add the following:

--Claims priority, application Germany, January 14, 1972,

P 22 02 401.7--

Signed and sealed this 16th day of April 1974.

(SEAL)
Attest:

EDWARD M.FLETCHER,JR.
Attesting Officer

C. MARSHALL DANN
Commissioner of Patents